Figure 1:
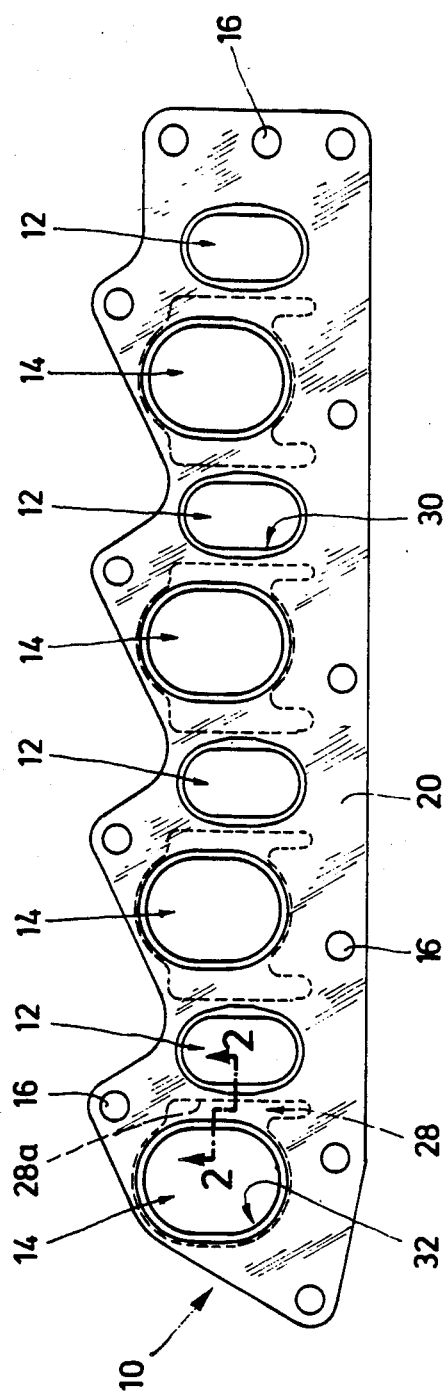

United States Patent [19]

Beutter et al.

[11] Patent Number: 4,676,514

[45] Date of Patent: Jun. 30, 1987

[54] COMBINED INTAKE-EXHAUST GASKET FOR INTERNAL COMBUSTION ENGINES

[75] Inventors: Ulrich Beutter, Reutlingen; Hansgeorg Gronle, Filderstadt, both of Fed. Rep. of Germany

[73] Assignee: Elring Dichtungswerke GmbH, Fed. Rep. of Germany

[21] Appl. No.: 902,525

[22] Filed: Sep. 2, 1986

[30] Foreign Application Priority Data

Sep. 4, 1985 [DE] Fed. Rep. of Germany ....... 3531551

[51] Int. Cl.$^4$ .............................................. F16J 15/12
[52] U.S. Cl. .................... 277/235 B; 277/22
[58] Field of Search .................. 277/22, 166, 233, 234, 277/235 R, 235 A, 235 B

[56] References Cited

U.S. PATENT DOCUMENTS

| 1,814,283 | 7/1931 | Braner | 277/22 |
| 3,433,490 | 3/1969 | Teucher et al. | 277/235 B X |
| 3,866,926 | 2/1975 | Traum | 277/235 B X |
| 4,312,512 | 1/1982 | Conte et al. | 277/235 B |

FOREIGN PATENT DOCUMENTS 973902 11/1982 U.S.S.R. .......... 277/235 B

Primary Examiner—Robert S. Ward
Attorney, Agent, or Firm—Pahl, Lorusso & Loud

[57] ABSTRACT

A combined intake-exhaust gasket for internal combustion engines comprising a gasket plate which has at least one metallic intermediate layer arranged between two outer metallic layers and in which at least one exhaust-outlet opening and one intake opening adjacent thereto are provided, each of which is limited by a sealing element. In order to seal the intake opening by means of an elastomeric sealing ring but also protect this ring from the high exhaust temperatures and mechanical wear and tear, the sealing element of the intake opening has a sealing ring which is made of elastomeric material and limits this opening as well as a web-like metallic support member which is secured to the sealing ring, projects outwardly therefrom in radial direction and is inserted loosely between the outer layers of the gasket plate. The intermediate layer has a recess which is located in the region between exhaust-outlet opening and intake opening and faces the latter and so the intermediate layer terminates in this region at a distance from the support member of the sealing element for the intake opening. This creates an air cushion between the outer layers of the gasket plate which is adjacent the support member in the direction facing the exhaust-outlet opening.

7 Claims, 2 Drawing Figures

COMBINED INTAKE-EXHAUST GASKET FOR INTERNAL COMBUSTION ENGINES

The invention relates to a combined intake-exhaust gasket for internal combustion engines comprising a gasket plate having at least one metallic intermediate layer arranged between two outer metallic layers and provided with at least one exhaustoutlet opening and one intake opening adjacent thereto, each of these openings being limited by a sealing element.

In modern engines, the fuel mixture process must be so exact that high requirements have to be placed on the quality of the seal in the intake region since the induction of infiltrated air can no longer be tolerated—the exhaust tests now carried out in the car industry could not be passed. A reliable seal in the intake region is not a problem when separate flat gaskets are used for the intake region and the exhaust region. The intake gasket is not, in this case, subjected to the high temperatures of the exhaust region and so a metallic gasket plate may be used, for example, as the intake seal, this plate having sealing beads of an elastomeric material applied to it, for example by the screen printing process. It is a different matter for combined intake-exhaust gaskets which are required more and more. Gaskets of the type described at the beginning are known for this purpose and have metallic sealing elements which do not, however, guarantee the sealing qualities required today. The same applies for known, combined intake-exhaust gaskets made of a soft material and metal, in which fiber-containing soft material layers are arranged between the metal layers. An absolute seal for the intake region is not, however, guaranteed in view of the permeability to gas of these fiber-containing soft material layers.

The object underlying the invention was therefore to provide a combined intake-exhaust gasket with permanently good sealing qualities in the intake region. Proceeding on the basis of a flat gasket of the type described at the outset, this object may be accomplished in accordance with the invention in that the sealing element of the intake opening has a sealing ring made of an elastomeric material and limiting the intake opening as well as a metallic support member secured to the sealing ring and projecting outwardly therefrom in radial direction, the support member forming a ring and having a web-like cross section and also engaging all the way round between the two outer layers, and that the intermediate layer has a recess located in the region between exhaust-outlet opening and intake opening and facing this intake opening and this intermediate layer therefore terminates in this region at a distance from the support member. It is therefore possible for the support member of the rubber-metal sealing element for the intake opening to terminate directly at the metallic intermediate layer all the way around the intake opening, except in the direction towards the exhaust-outlet opening. At the same time, the inventive recess has the effect that a cushion of air acts as a heat-insulating region in the direction towards the exhaust-outlet opening to protect the sealing element for the intake opening from the high temperatures of the hot exhaust gases. Despite the fact that both the intake and exhaust regions are sealed by one single gasket, it is possible to use an elastomeric sealing element in the intake region and this guarantees a very good and permanent seal for the intake opening. Moreover, the inventive gasket may be produced without problem since the recess can be made during punching out of the metallic intermediate layer without extra cost. It is recommended that the elastomeric sealing ring be made from elastomers which are relatively unaffected by changes in temperature, such as, for example, silicone elastomers, fluoroelastomers, fluorosilicone elastomers or elastomers of hydrogenated nitrile rubber. The elastomeric sealing ring of the inventive gasket is secured to the annular support member along its entire circumference and the annular support member is held along its entire circumference between the outer metallic layers of the gasket. This means that the latter provides the elastomeric sealing ring with a good support all around which is particularly important when the sealing ring is oval in shape. The intake openings are normally oval.

Flat gaskets comprising a plurality of openings, some of which are edged by metallic sealing elements and the others by elastomeric sealing elements, are already known from the state of the art (cf., for example, supplement to "MTZ Motortechnische Zeitschrift" 46 (1985) 3, page VI and German published application DE-A-No. 30 01 730). However, these are solely cylinder head gaskets which have a rubber-metal sealing element sealing a coolant opening. These known cylinder head gaskets are metallic multi-layered gaskets comprising two outer metallic layers accommodating a metallic intermediate layer between them. The latter is set back somewhat around the coolant opening in relation to the cutout edges in the outer layers so that a metallic support in the form of an annular web, which secures the elastomeric sealing element, may be inserted between and secured by the outer layers. No space is, however, provided between the support member of the rubber-metal element and the metallic intermediate layer which would form a heat-insulating cushion of air. In a second metallic, multi-layered cylinder head gasket, the metallic intermediate layer projects radially inwards in the region of the coolant opening beyond the outer layers and holds the sealing ring which is vulcanized to this intermediate layer and seals the coolant opening. At the same time, the metallic intermediate layer is set back somewhat around the combustion chamber opening so that a metallic sealing ring comprising a support web formed thereon and projecting radially outwards can be inserted between the outer layers of the gasket plate, whereby the support web does, however, terminate directly at the metallic intermediate layer. In this known cylinder head gasket, the metallic intermediate layer does have a recess but this extends radially outwards from the combustion chamber opening to the outer edge of the gasket plate and at a considerable distance from the coolant opening since the recess of this cylinder head gasket merely forms a drain channel for gas overflowing out of the combustion chamber over the combustion chamber sealing element. This state of the art cannot therefore disclose any suggestion as to how a sealing element made of an elastomeric material may be protected from the high temperatures of exhaust gases. In the case of a one-layered cylinder head gasket, which is made of metal apart from elastomeric sealing rings, it is already known (U.S. Pat. No. 4,114,906) to protect each elastomeric sealing ring sealing the coolant openings by means of an air gap acting as a heat-insulating zone against the high temperatures issuing from the adjacent combustion chamber opening. For this purpose, two concentric openings, which merge into one another, form parts of a circle and have different radii, are punched out of the metallic gasket plate of the cylinder head gasket for each coolant opening. The opening having the larger radius is located on the side of the coolant opening facing the adjacent combustion chamber opening and the circular edge of the opening have the smaller radius is embedded in the elastomeric sealing ring. The external radius of the sealing ring is somewhat smaller than the radius of the larger part-circular opening and so the said air gap results between the outer circumference of the elastomeric sealing ring and the circular edge of the larger opening. In this known cylinder head gasket, the elastomeric sealing ring is consequently supported by the gasket plate only along less than two-thirds of its circumference. This means that special measures are necessary to secure the position of the elastomeric sealing ring in the axial direction of the coolant opening which is to be sealed. For this purpose, a counterbore concentric to the coolant opening must be worked into the cylinder liner which accommodates the coolant opening. The elastomeric sealing ring is then inserted into this counterbore. This measure is one which cannot be transferred to combined intake-exhaust gaskets and would also no longer be accepted for use in today's cylinder head gaskets.

Furthermore, in cylinder head gaskets comprising a gasket plate consisting of a soft material, it is known (German published application DE-AS No. 1 576 720) to provide special cooling for the sealing elements for the combustion chamber openings, these sealing elements being designed as metal flange rings. For this purpose, the metal flange rings which have a C-shaped cross section are secured to the gasket plate by a plurality of tabs which protrude from the gasket plate in radial direction towards the center of the relevant combustion chamber opening and engage between the webs of the relevant metal flange ring. At the same time, slot-like recesses of the gasket plate extend between these tabs along the outer circumference of the relevant metal flange ring. These recesses communicate with openings in the cylinder head, which supply cooling water, via slots extending radially outwards. Apart from the fact that an intake-exhaust gasket cannot be cooled by means of cooling water, the transfer of this known construction to the region of the elastomeric sealing ring for an intake-exhaust gasket which seals the intake opening would not result in a serviceable product because, as in the cylinder head gasket of U.S. Pat. No. 4,114,906, the elastomeric sealing ring would then be supported by the gasket plate in a completely unsatisfactory manner.

Finally, German laid-open paper DE-OS No. 27 28 970 discloses a multi-layered intake gasket comprising outer soft-material layers and an intermediate layer molded from a synthetic resin which is unaffected by changes in temperature. The intermediate layer is perforated in the area around the intake opening to reduce the passage of heat through the intake gasket in a direction at right angles to the gasket plane due to the air pockets thus formed. The purpose hereof is to prevent a carburetor from becoming too heated. The transfer of this feature to a combined intake-exhaust gasket would also not lead to the result aspired to in the present invention. In the case of a metallic intermediate layer, numerous heat-conducting bridges would be formed between the perforations in the gasket plane and these could not protect the elastomeric sealing ring from the high temperatures in the combustion chamber.

In a preferred embodiment providing optimum protection for the rubber-metal sealing element of the intake opening, the length of the recess corresponds at least approximately to the length of the gasket plate region lying between the two openings. This means that no heat can be conducted along the short distance from the edge of the exhaust-outlet opening to the edge of the intake opening.

In principle, it would be conceivable to extend the recess as far as the outer edge of the gasket plate so that the circumferential regions of the two openings are thermally unconnected with one another to a very large extent, at least on one side. Since, however, the stability of the gasket plate would be decisively weakened thereby, it is recommended that the recess be terminated at a distance from the outer edge of the gasket plate.

In order to avoid wear and tear on the elastomeric sealing ring due to movement between the engine block and the exhaust or induction manifolds, a particularly advantageous embodiment of the inventive gasket provides for the support member of the elastomeric sealing ring to be inserted loosely between the outer layers of the gasket plate, i.e. the thickness of the support member is less than the distance between the outer layers of the gasket plate resulting from the thickness of the intermediate layer(s). This means that the sealing element of the intake opening and, with it, the elastomeric sealing ring can follow the movements mentioned above. In order to ensure the mobility of the sealing element for the intake opening even when the manifold is tightened down, it is recommended that the gasket plate be constructed such that an annular region of the gasket plate surrounding the exhaust-outlet opening is thicker than the remaining area of the gasket plate. This may be achieved, for example, in that the area surrounding the exhaust-outlet opening has an additional intermediate layer or is made of a thicker sheet metal so that it can absorb a greater amount of pressure and relieve pressure on the area in which the support member for the elastomeric sealing ring is mounted.

Elastomeric sealing rings which are used for sealing fluid openings and are held for "floating" movement are known per se for cylinder head gaskets (U.S. Pat. 4,535,999). In this state of the art, the elastomeric sealing rings each have a metallic support member which forms a ring and has a web-like cross section. This support member is embedded in the relevant sealing ring apart from tabs projecting outwards in radial direction. These tabs each engage between the arms of a metallic hollow rivet, which is C-shaped in cross section and secured in the gasket plate, such that they have clearance in a direction at right angles to the plane of the gasket plate and so the elastomeric sealing rings can move in this direction.

Additional features, advantages and details of the invention result from the attached drawings as well as the following description of a particularly advantageous embodiment of the inventive combined intake-exhaust gasket. In the drawings, FIG. 1 is a plan view of such a gasket for a 4-cylinder engine and FIG. 2 is a section through this gasket along line 2—2 in FIG. 1.

FIG. 1 shows a gasket plate 10 comprising four exhaust-outlet openings 12 and four intake openings 14 which are arranged such that at least one exhaust-outlet opening 12 is located next to each intake opening 14. In addition, openings 16 for screws are provided in the gasket plate.

Figure 2:
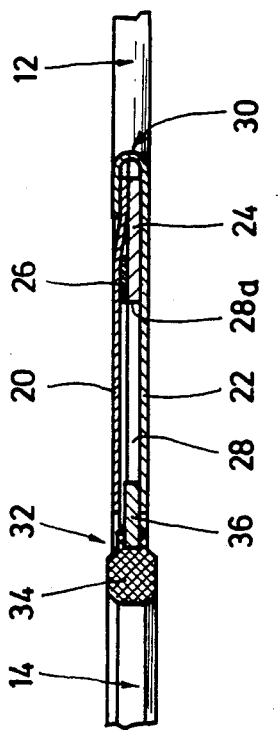

The construction of the gasket plate 10 is best shown in FIG. 2. The gasket plate consists of a total of four sheet metal layers, namely upper and lower outer layers 20 and 22, respectively, between which a main intermediate layer 24 and a second intermediate layer 26 are disposed. The various sheet metal layers are stamped metal parts, from which the various openings are punched. In this respect, the intermediate layers 24 and 26 are provided with a recess 28 on each side of each intake opening 14, on which an exhaust-outlet opening 12 is disposed adjacent thereto. The edge 28a of each recess forms, according to the invention, an elongated rectangle having very rounded corners and a passage to the intake opening 14 which is open at the edge and displaced towards a narrow side. As shown by FIG. 1, the recesses 28 extend upwardly and downwardly (in accordance with FIG. 1) beyond the exhaust-outlet opening 12 and the edge 28a of each recess is much closer to the respective exhaust-outlet opening 12 than to the intake opening 14.

A sealing element for limiting each exhaust-outlet opening 12 is formed in that the lower outer layer 22 is first bent upwards to penetrate through the exhaust-outlet opening 12, then bent over and pressed down onto the upper outer layer 20. This creates the sealing element which is designated in the drawings as 30 and forms an edge trim for the opening 12. In order to obtain a uniform thickness in this region, the opening punched out of the second intermediate layer 26 for the respective exhaust-outlet opening 12 is larger than the opening punched out of the main intermediate layer 24 (see FIG. 2).

Each of the intake openings 14 is edged by a rubber-metal sealing element 32 consisting of an elastomeric sealing ring 34 and a sealing element support member 36. The latter has the shape of an annular web which engages with axial clearance (at right angles to the plane of the gasket plate 10) between the outer layers 20, 22 (see FIG. 2). Consequently, the thickness of the sealing element support member 36 is less than the sum of the thicknesses of the intermediate layers 24 and 26.

As shown in FIG. 1, the intermediate layers 24 and 26 surround the seal element support member 36 all around such that a very slight radial clearance is left except in the region of the recesses 28 where an air cushion between the outer layers 20, 22 is located adjacent the seal element support member 36 (see FIG. 2) in order to protect the elastomeric sealing rings 34 from the high exhaust temperatures in the region of the exhaust-outlet openings 12.

What is claimed is:

1. A combined intake-exhaust gasket for internal combustion engines comprising a gasket plate having at least one metallic intermediate layer arranged between two outer metallic layers and provided with at least one exhaust-outlet opening and one intake opening adjacent thereto, each of said openings being limited by a sealing element, characterized in that the sealing element (32) of the intake opening (14) has a sealing ring (34) made of an elastomeric material and limiting said intake opening as well as a metallic support member (36) secured to said sealing ring and projecting outwardly therefrom in radial direction, said support member forming a ring and having a web-like cross section and also extending all the way round between the two outer layers (20, 22), and that the intermediate layer (24, 26) has a cut-out (28) located in the region between exhaust-outlet opening and intake opening (12 and 14, respectively) and facing said intake opening, and said intermediate layer therefore terminates in this region at a distance from the support member (36).

2. Gasket as defined in claim 1, characterized in that the edge (28a) of the recess is disposed at a greater distance from the support member (36) than from the exhaust-outlet opening (12).

3. Gasket as defined in claim 1, characterized in that the length of the recess (28) corresponds at least approximately to the length of the gasket plate region located between the two openings (12, 14).

4. Gasket as defined in claim 1, characterized in that the recess (28) terminates at a distance from the outer edge of the gasket plate (10).

5. Gasket as defined in claim 1, characterized in that the support member (36) is loosely inserted between the outer layers (20, 22) of the gasket plate (10).

6. Gasket as defined in claim 5, characterized in that the thickness of the support member (36) is less than the distance between the outer layers (20, 22) resulting from the thickness of the intermediate layer(s) (24, 26).

7. Gasket as defined in claim 5, characterized in that an annular region of the gasket plate (10) surrounding the exhaust-outlet opening (12) is thicker than the remaining areas of the gasket plate.

* * * * *